No. 683,696. Patented Oct. 1, 1901.
L. MAILLARD.
DENTAL DRILL.
(Application filed June 24, 1901.)
(No Model.)

WITNESSES
S. R. Earle
Stanley J. Palmer

INVENTOR
Louis Maillard,
By H. Dixon,
Atty.

THE NORRIS PETERS CO., PHOTO-LITHO., WASHINGTON, D. C.

UNITED STATES PATENT OFFICE.

LOUIS MAILLARD, OF GALT, CANADA.

DENTAL DRILL.

SPECIFICATION forming part of Letters Patent No. 683,696, dated October 1, 1901.

Application filed June 24, 1901. Serial No. 65,886. (No model.)

*To all whom it may concern:*

Be it known that I, LOUIS MAILLARD, of the town of Galt, in the county of Waterloo and Province of Ontario, Canada, have invented certain new and useful Improvements in Dental Drills; and I do hereby declare that the following is a full, clear, and exact description thereof, reference being had to the accompanying drawings, which form part of this specification.

My invention relates particularly to the form and arrangement of the cutting edges, and has for its object to form the cutting edges irregular with alternate similarity and the lands of the alternate cutting edges serrated and in such a manner that they will better facilitate the removal of the tooth substance, while the liability to choke and interfere with the cutting edges is amply provided for by the additional amount of clearance permissible with this form and arrangement of the cutting edges. This particular form and arrangement of the cutting edges is applicable to many of the various forms of dental drills, and to illustrate my invention I have shown this form of construction adapted to and arranged in the form of what is better known as a "fissure-bur."

To such ends the invention consists in the construction and combination of parts particularly described and claimed, reference being had to the accompanying drawings, forming part thereof, in which similar figures of reference refer to like parts throughout.

Figure 1:
Figure 2:
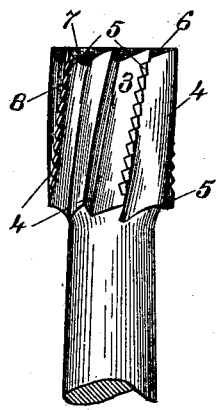
Figure 3:
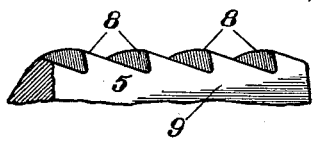
Figure 4:
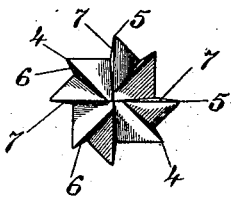

Figure 1 is a view in elevation of the entire dental drill, showing the improved head and the usual style of shank. Fig. 2 is an enlarged view in elevation of the cutting-head. Fig. 3 is a detail view, much enlarged, of a portion of one of the serrated cutting edges; and Fig. 4 is an enlarged view in plan, showing the arrangement of the cutting edges on the end.

The various parts of my improved dental drill consist of the usual shank 1, the contracted portion 2, and the laterally-projecting portion or cylindrical cutting-head 3. The cutter-head 3 is provided with two cutting-surfaces, the periphery of the cylindrical portion forming one and consisting of cutting edges formed, preferably, by spiral fluting, and the end forming the other and consisting of cutting edges formed by cross-fluting. The cutting edges of the end are contiguous with those of the side, standing at right angles in this form of fissure-bur. The cutting edges are spaced irregular with alternate similarity, those on the periphery consisting of plain and serrated cutting edges 4 and 5, respectively, and arranged alternately and those on the end consisting of plain cutting edges 6 and 7, contiguous with the cutting edges 4 and 5, respectively.

The irregular spacing of the cutting edges permits the fluting to be carried to a greater depth adjacent to the alternate lands of the cutting-head 3. This additional amount of clearance is provided for the cuttings of the serrated cutting edge 5, which removes by far the greater quantity, acting as a break and more readily removing the tooth substance, while the alternate plain cutting edges maintain the desired surface.

The teeth 8 of the serrated cutting edges 5 are sort of a hooked-shaped ratchet formed at an angle with the cutting-face 9 and having a backward inclination or rake, the object of which is to assist the drill in penetrating the tooth substance.

It will be observed that the cutting edges 6 and 7 are arranged alternate, as shown in Fig. 4—that is, those contiguous with the cutting edges 5—namely, the cutting edges 7—meet in the center of the end cutting-surface, and those contiguous with the plain cutting edges 4—namely, the cutting edges 6—join the aforesaid cutting edges 7 a short distance from the center. From the foregoing it is obvious that the cutting edges 7 are radial, while the alternate cutting edges 6 are tangential.

I wish it understood that I do not confine myself to any particular number of cutting edges; but by the combination of the aforesaid arrangement and construction I am enabled to penetrate and remove the tooth substance more rapidly than heretofore and still produce a smooth surface, which is a desideratum.

Having described my invention, what I claim as new, and desire to secure by Letters Patent, is—

1. A dental drill provided with two cutting-surfaces, the cutting edges of said surfaces contiguous and irregularly spaced, on the periphery a series of plain cutting edges arranged alternate with a series of serrated cutting edges, and on the end a series of radial cutting edges arranged alternate with a series of tangential cutting edges, for the purpose hereinbefore set forth.

2. A dental drill having two cutting-surfaces, the cutting edges of said surfaces contiguous and irregularly spaced, the fluting adjacent to each alternate cutting edges of greater depth, on the periphery the lands of each alternate cutting edges serrated, on the end the cutting edges contiguous with the said serrated cutting edges meeting at a point in the center, and the cutting edges contiguous with the alternate cutting edges joining the aforesaid cutting edges a short distance from the center, for the purpose hereinbefore set forth.

In witness whereof I have hereunto set my hand in presence of two witnesses.

LOUIS MAILLARD.

Witnesses:
J. MARION McNAUGHTON,
T. M. GIRCRICE.